United States Patent [19]

Wymann

[11] Patent Number: 4,718,339

[45] Date of Patent: Jan. 12, 1988

[54] PRESS WITH CHUCKING PLATES FOR SETS OF TOOLS

[75] Inventor: Hans Wymann, Lyss, Switzerland

[73] Assignee: Feintool International Holding, Switzerland

[21] Appl. No.: 857,725

[22] Filed: Apr. 30, 1986

[30] Foreign Application Priority Data

May 1, 1985 [CH] Switzerland ........................ 1843/85

[51] Int. Cl.[4] ........................ B21D 37/14; B30B 15/02

[52] U.S. Cl. .................................... 100/295; 100/918; 72/481

[58] Field of Search ........................ 269/309; 198/345; 29/464, 465; 72/462, 448, 446, 481; 100/295, 918, 299; 403/381, 331, 353

[56] References Cited

U.S. PATENT DOCUMENTS

| | | | |
|---|---|---|---|
| 3,075,416 | 1/1963 | Stuhldreher | 72/481 |
| 3,111,100 | 11/1963 | Georgeff | 100/918 X |
| 4,674,315 | 6/1987 | Linz | 72/481 |

FOREIGN PATENT DOCUMENTS

| | | | |
|---|---|---|---|
| 1192624 | 5/1970 | United Kingdom | 72/462 |

OTHER PUBLICATIONS

"Beschreibung des Funktionsablaufes des Schwenk-Senkspanners Typ 2154"+spec sheets 6.2150.1-6.2180.1 of Hilma Gmbh, D-5912 Hilchenbach, West Germany, Oct. 1982 edition.

*Primary Examiner*—Andrew M. Falik

*Attorney, Agent, or Firm*—Goodman & Teitelbaum

[57] ABSTRACT

Two locking clamp-bars are slidingly accommodated in two parallel T-slots of an upper plate and in T-slots of upper grippers of a press. Each locking clamp-bar has two T-pieces. Upon rising of a lower plate, acting as the press ram, together with the set of tools, the T-pieces of locking clamp-bars are in a first position, in which they can enter recesses in further T-slots in an upper part of the set of tools or in an upper auxiliary plate. By means of a drive device, the T-pieces are pushed into a second position, in which they snap into the further T-slots. In this press, a non-destructive removal of tools is ensured in the event of a defective chucking mechanism.

11 Claims, 20 Drawing Figures

14
1
4a
3a
3b
4b
2

1
3
2

1
9
6
12
3a
3
3b
18
8
17
5
10

1
9
12
4a
3a
3
3b
4b
20
19
2
8
10
6
18
5
11
16a
16

PRESS WITH CHUCKING PLATES FOR SETS OF TOOLS

BACKGROUND OF THE INVENTION

This invention relates to machine tools, and more particularly to a press of the type having an upper and a lower plate for chucking a set of tools consisting of an upper part and a lower part, one plate of which acts as the press ram, which is movable toward and away from the other plate acting as the press table, at least one T-slot being provided both in the chucking plates and in the upper and lower tool parts, and having at least two grippers mounted in each of either the upper chucking plate or in the upper tool part and in the lower chucking plate, with T-slots which are continuously aligned with the respective T-slot of the chucking plates or of the upper tool part, the T-slot of the upper chucking plate or the T-slot of the upper tool part having two recesses remote from one another.

The major part of the downtime for presses is caused by tool changes. Tools can weigh more than 500 kg without auxiliary plates. The changeover time for manual tool changes can be reduced by automatic hydraulic or hydromechanical tool chucking. Means such as the swivel grippers sold by the firm of Hilma GmbH, 5912 Hilchenbach, West Germany, are used for rapid chucking and dechucking of the tool on the press table or press ram. The tool has T-shaped recessed into which the tie rods of the swivel grippers are introduced by lowering the press-ram plate onto the upper tool part and are swivelled through 90° in order to snap into the T-slots of the tool.

A great disadvantage of these swivel grippers is that if the pivoting mechanism of such grippers with tie rods becomes defective, the clamping connection can no longer be released because the chucking system is not accessible from behind the press. In such a case, the tool must be destroyed because there is no other way of removing it from the press.

SUMMARY OF THE INVENTION

It is an object of this invention to provide a press in which, by simple and compact means, the danger of destroying the tool in the case of a defective chucking mechanism is eliminated.

To this end, the press according to the present invention, of the type initially mentioned, comprises at least two locking and clamping means suitably spaced from one another in the T-slot of the upper chucking plate or in the T-slot of the upper tool part and structurally separate from the grippers, which means are intended to be introduced into the recesses of the T-slot of the upper tool part or into the recesses of the T-slot of the upper chucking plate and subsequently to be locked in this T-slot outside the recesses and clamped tight.

BRIEF DESCRIPTION OF THE DRAWINGS

Preferred embodiments of the invention will now be described in detail with reference to the accompanying drawings, in which.

DESCRIPTION OF THE PREFERRED EMBODIMENTS

Figure 3:
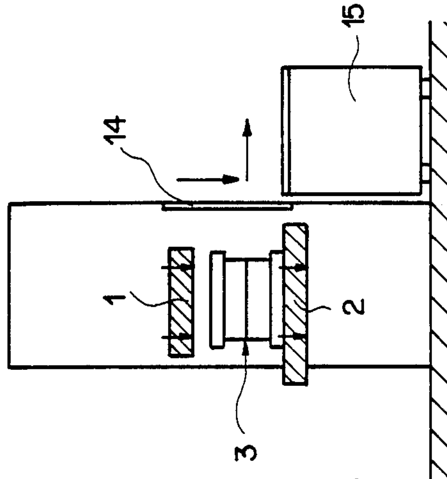
FIGS. 1 to 5 are diagrammatic elevations illustrating the successive stages in changing and chucking a tool set in a press.
Figure 2:
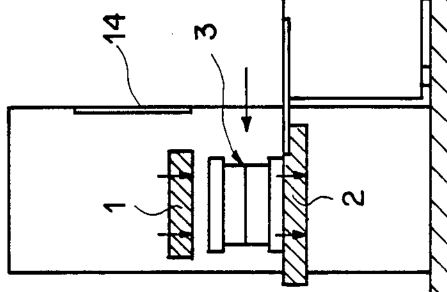
Figure 1:
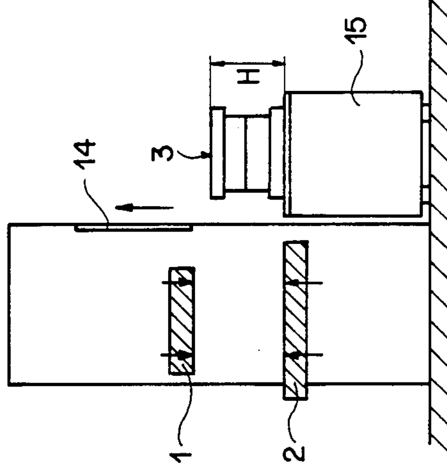
Figure 5:
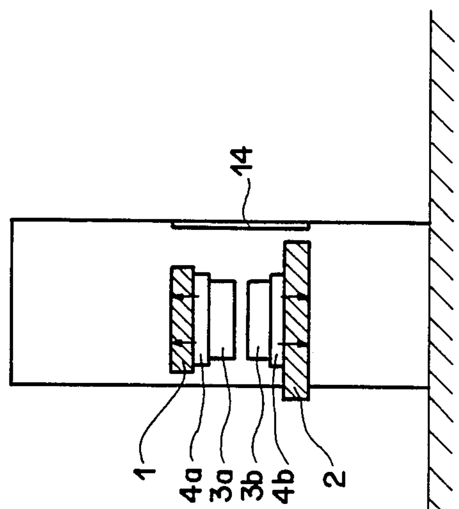
Figure 4:
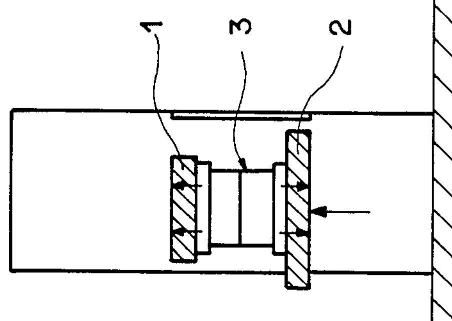
Figure 6:
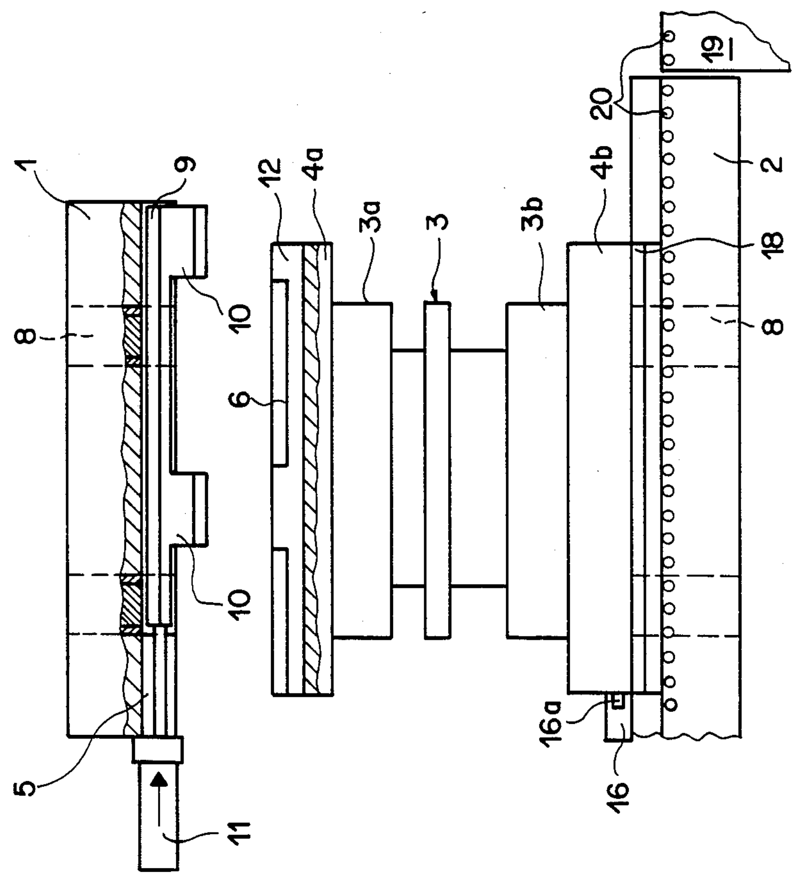
FIG. 6 is an elevation, partially broken away and in section, of a tool set with auxiliary plates fixed on the lower chucking plate of the press, a locking clamp-bar being accommodated in the T-slot of the upper chucking plate.

As shown in FIGS. 1–5, a set of tools 3 consisting of a lower tool part **3*b* and an upper tool part 3*a* placed loosely upon it, of any desired height H, is brought by a suitable carrier, such as carriage 15 as shown in FIGS. 1–3, to the level of a lower chucking plate 2 beneath an upper chucking plate 1 of a press. Usually, a press of this type has a sliding door 14, which is raised to open the press to receive the tool set 3, as shown in FIGS. 1 and 2, after which the sliding door 14 is lowered to close the press, as shown in FIGS. 3–5. Alternatively, tool set 3 may be placed on a pair of supports 19, as shown in FIG. 6. For this purpose, tool set 3 is placed upon supports 19 by means of a crane or fork-lift (not shown), then pushed over a roller train 20, disposed both on supports 19 and on lower chucking plate 2 for horizontal displacement of the tool set 3 until it comes up against a stop 16 provided with a proximity switch 16*a*. The pair of supports 19 is removably hooked to lower chucking plate 2**.

Upper tool part **3*a* and lower tool part 3*b* are provided with auxiliary plates 4*a*, 4*b*, respectively, on which tools and accessories may be mounted beforehand outside the press. Lower chucking plate 2**, acting as the ram of the press, e.g., a precision blanking press, is at bottom dead center, which means that the seat height always remains constant, even if the tool height H is not the same.

In FIG. 6, lower tool part **3*b* with its lower auxiliary plate 4*b* is shown already clamped to lower chucking plate 2. This is achieved by pushing clamp-bars 18, secured to the bottom of lower auxiliary plate 4*b*, into matching slots 5 of lower chucking plate 2 and clamping them tight by means of four grippers 8 provided in lower chucking plate 2. The clamping action of lower grippers 8, as set forth below, is triggered by proximity switch 16*a* in stop 16 when the inserted tool set 3 comes up against the latter. The clamping force is transmitted via clamp-bars 18 to lower auxiliary plate 4*b* or to lower tool part 3*b***.

Figure 10:
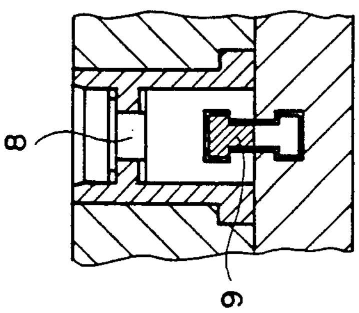
FIG. 10 is a section taken on the line X—X of FIG. 8.
Figure 11:
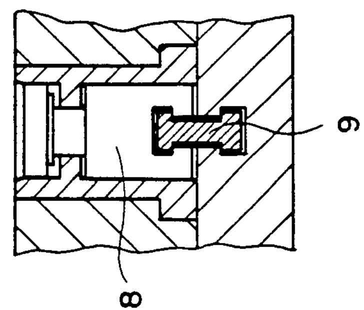
FIG. 11 is a section taken on the line XI—XI of FIG. 9.
Figure 13:
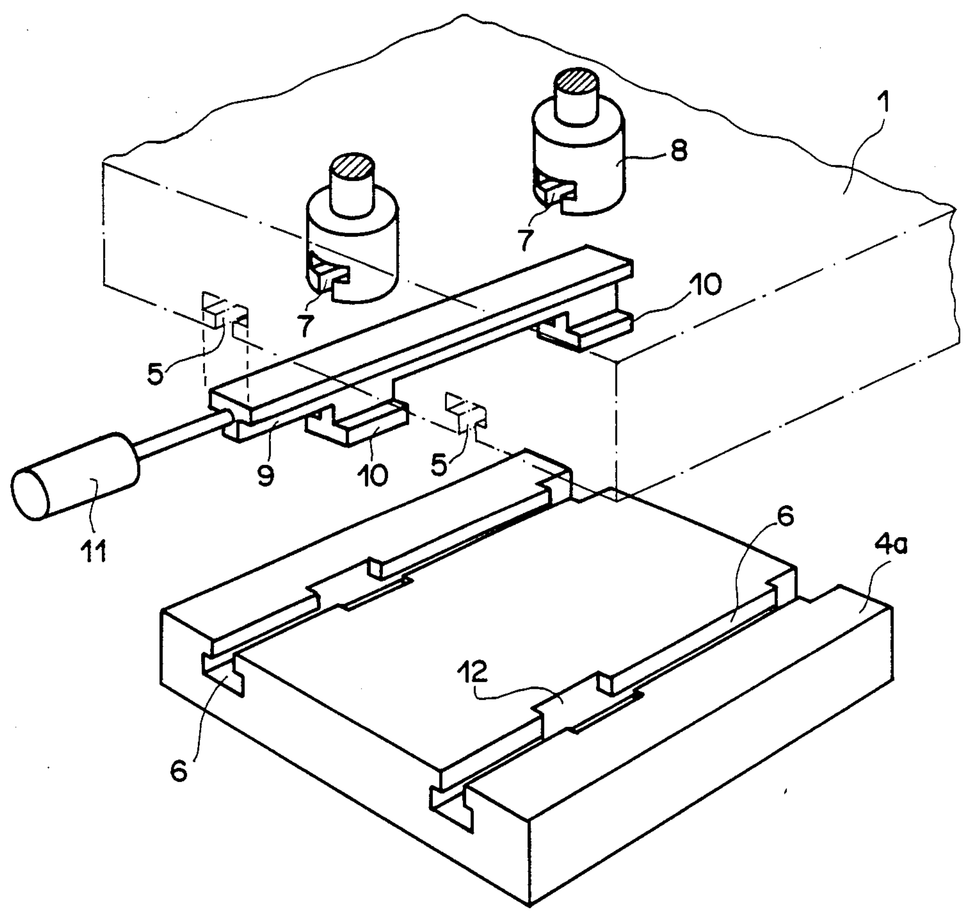
FIG. 13 is an exploded perspective view of the locking clamp-bar, two upper grippers, and an upper auxiliary plate with two T-slots.

Both in chucking plates 1, 2 and in upper tool part **3*a* and lower tool part 3*b*, or in auxiliary plates 4*a*, 4*b* secured thereto, two parallel T-slots 5, 6 each are provided. Disposed in each chucking plate 1, 2 are four grippers 8 which are likewise provided with T-slots 7 continuously aligned with T-slots 5 of chucking plates 1, 2. Grippers 8 integrated in chucking plates 1, 2 may be operated hydraulically or mechanically or hydromechanically upon actuation of the proximity switches associated therewith in a manner well known in the art, such as by the above mentioned proximity switch 16a which controls the lower grippers 8, or the proximity switch 17 which controls the upper grippers as set forth below. Each gripper 8, as best shown in FIGS. 10 and 11, includes a cylinder having a movable piston therein, each piston being provided with one of the T-slots 7, as best shown in FIG. 13. When the grippers 8 are actuated, the piston thereof is moved away from the clamp-bar 18, or the clamp-bar 9 as set forth below, to provide a tight clamping thereof, as indicated in FIG. 11**.

Slidingly accommodated in T-slots 5 of upper chucking plate 1 and in T-slots 7 of the upper grippers 8 are two locking clamp-bars 9, each with two spaced cams 10. Locking clamp-bars 9 are connected at one end of each to respective drive devices 11 by means of which they can be moved from one position to the other. Drive devices 11 may be hydraulic, pneumatic, electric, or mechanical.

Figure 7:
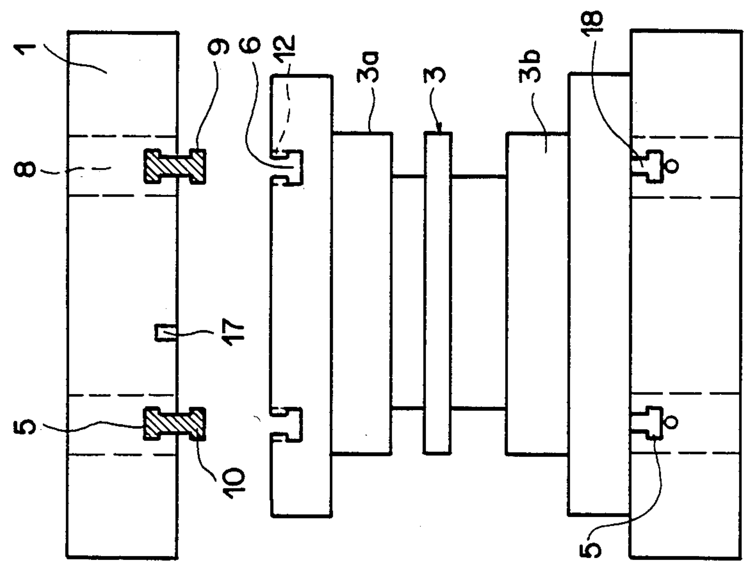
FIG. 7 is a side elevation corresponding to FIG. 6, partially in section.

When lower chucking plate 2, acting as the ram of the press, rises with tool set 3, locking clamp-bars 9 are in the first position, shown in FIG. 6. When upper auxiliary plate 4a comes to rest against upper chucking plate 1, a proximity switch 17 in upper chucking plate 1 (FIG. 7) is contacted, generating a signal which actuates drive device 11. In this first end position of locking clamp-bars 9, cams 10 have entered two respective recesses 12 of T-slots 6 of upper auxiliary plate 4a. When bars 9 are pushed in by drive devices 11, cams 10 are moved into the second position, in which they engage T-slots 6 of upper auxiliary plate 4a. Clamping of upper auxiliary plate 4a with upper tool part 3a is now initiated by upper grippers 8.

Figure 8:
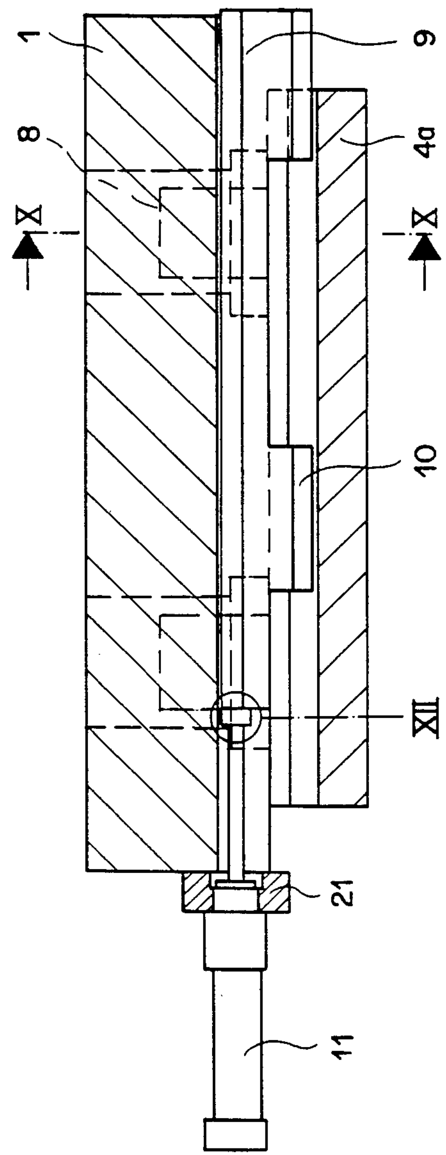
FIG. 8 is a longitudinal section through the upper chucking plate of the press, showing a locking clamp-bar in its pushed-in but not locked position.
Figure 9:
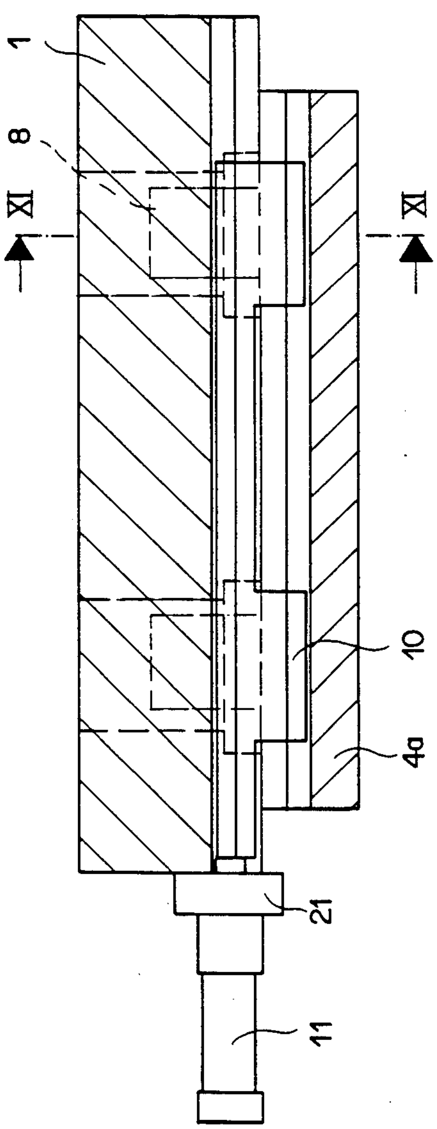
FIG. 9 is a longitudinal section through the upper chucking plate of the press, showing the locking clamp-bar in its locked and clamped position.
Figure 12:
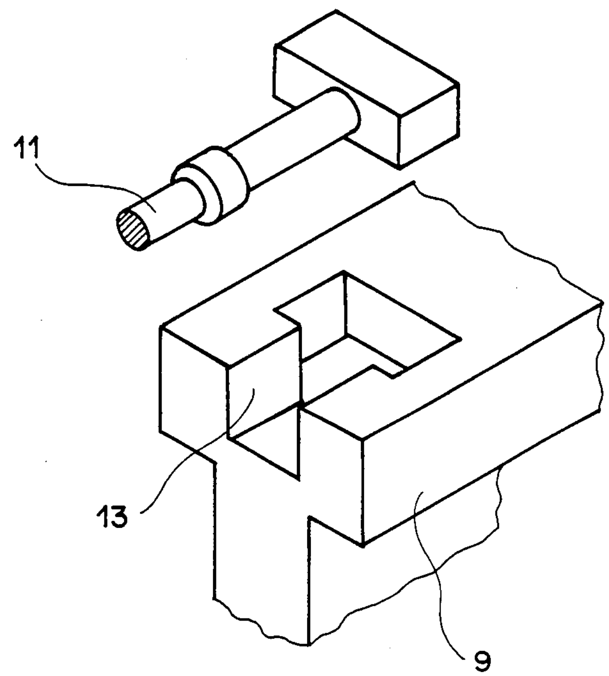
FIG. 12 is an exploded perspective view of a coupling part encircled in FIG. 8.

In FIGS. 8 and 10, locking clamp-bar 9 is shown in its pushedin but not locked position, and before upper grippers 8 have initiated clamping. In FIGS. 9 and 11, locking clamp-bar 9 is then shown in locked and clamped position in upper chucking plate 1 by the clamping movement of the pistons of the upper grippers 8. The slight vertical displacement of locking clamp-bar 9 relative to drive device 11, which is fixed, is made possible during clamping by a coupling part 13 of the locking clamp-bar 9 encircled in FIG. 8 (see also FIG. 12). An end-position monitor 21 for both end positions of locking clamp-bars 9 is likewise shown in section in FIG. 8.

According to the type of construction of the press, upper chucking plate 1 may act as the ram instead. In that case, too, locking clamp-bars 9 are mounted in slots 5 of upper chucking plate 1. In smaller presses, it is also possible to have only one slot 5 in each of the chucking plates 1 and 2, and only one locking clamp-bar 9, instead of two.

Figure 14:
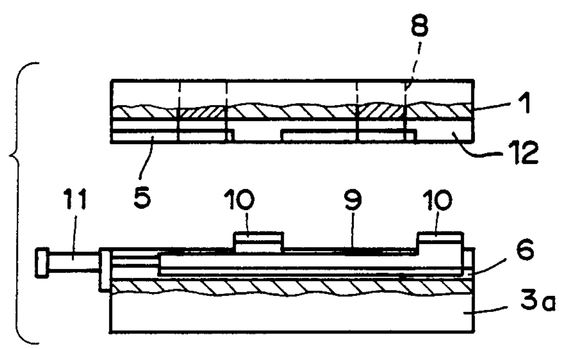
FIGS. 14 to 16 are diagrammatic views of parts of further embodiments.
Figure 15:
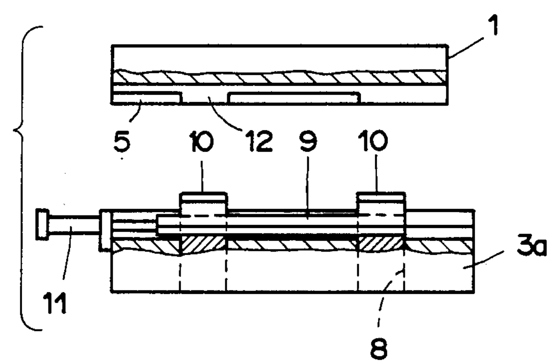
Figure 16:
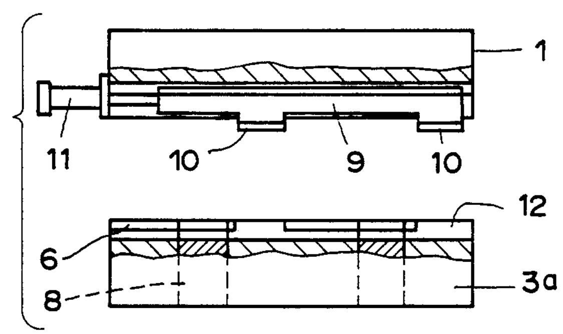

Illustrated diagrammatically in FIG. 14 is an embodiment in which upper grippers 8 are mounted in upper chucking plate 1 of the press, locking clamp-bars 9 with two cams 10 and the associated drive device 11 being slidingly accommodated in T-slot 6 of upper tool part 3a. T-slot 5, as well as recesses 12 which cams 10 are to enter, are in this case provided in upper plate 1. FIG. 15 diagrammatically illustrates an embodiment similar to the embodiment of FIG. 14, except the upper grippers 8 of the embodiment of FIG. 15 are mounted in the upper tool part 3a for engaging the clamp-bars 9 of the upper tool part 3a. FIG. 16 diagrammatically illustrates a further embodiment in which the parts of the embodiment of FIG. 14 are reversed, so that the clamp-bars 9 with two cams 10 and the associated drive device 11 are slidingly accommodated in the T-slots 5 of the upper plate 1, and the upper grippers are mounted in the upper tool part 3a similar to the embodiment of FIG. 15, as well as the recesses 12 which the cams 10 are to enter.

Figure 17:
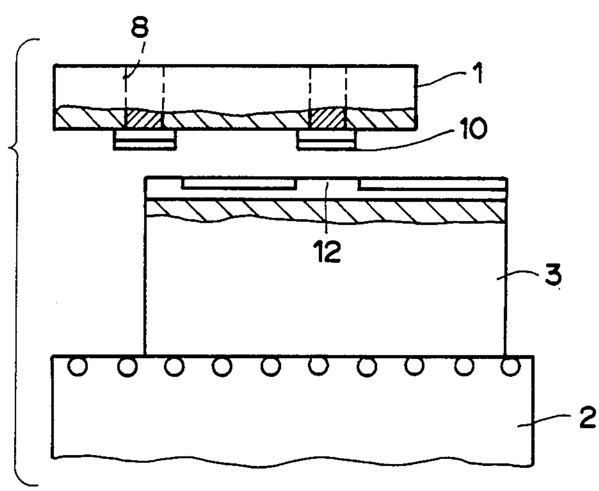
FIGS. 17 to 20 are diagrammatic views of a modification with a horizontally slidable tool set.
Figure 20:
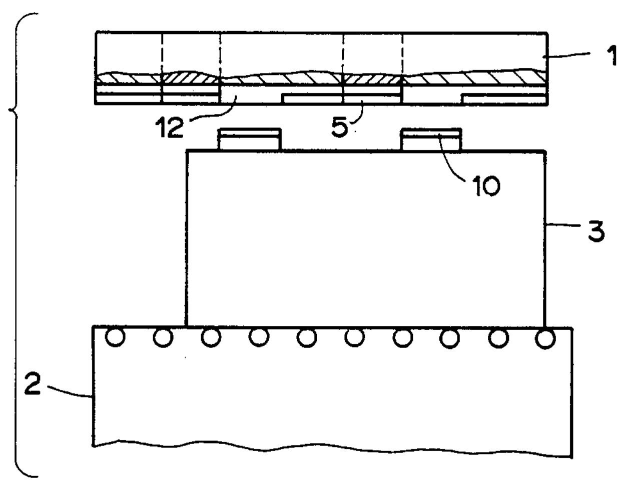
Figure 18:
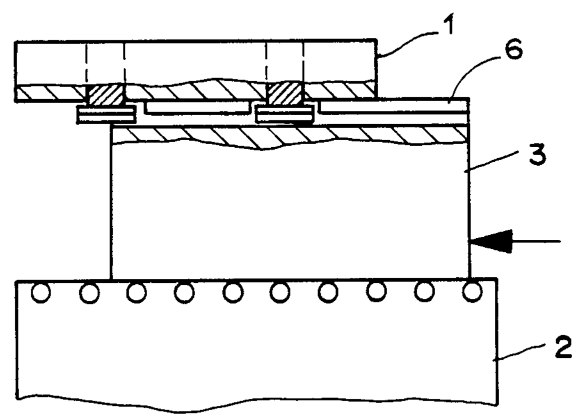
Figure 19:
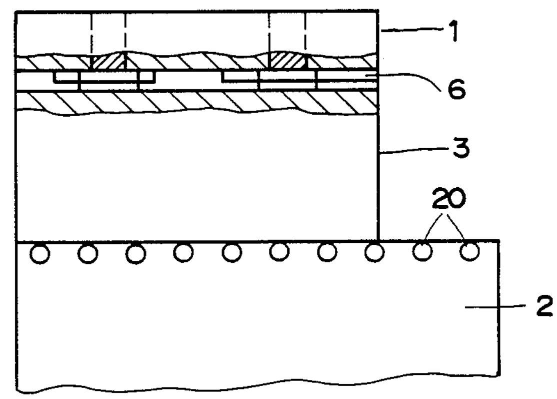

Diagrammatically shown in FIGS. 17 to 20 is a modification in which the locking and clamping means 10 are immovably fixed either in T-slot 5 of upper chucking plate 1 to enter the recesses 12 of the T-slots 6 of the tool set 3, as shown in FIGS. 17–19, or in T-slot 6 of upper tool part 3a to enter the recesses 12 of the T-slots 5 of the upper plate 1, as shown in FIG. 20. Here tool set 3 is displaced horizontally by the roller train 20 so that means 10 inserted in recesses 12 can be pushed in slot 5 or 6, after which upper tool part 3a of tool set 3 is clamped to upper chucking plate 1.

If there is trouble in the sliding or clamping mechanism of the press, the tool can be detached whatever the circumstances because the locking and clamping means, i.e., the sliding bars with their drive devices, are easily accessible; hence the destruction of the tool as hitherto customary is eliminated. At the same time, tools of any desired height can be chucked without previous adjustment of the press. As compared with prior art systems, changing tools takes less time. Control and monitoring are minimal.

What is claimed is:

1. A press of the type having upper and lower plates for chucking a set of tools consisting of an upper tool part and a lower tool part, one of said plates acting as a press ram movable toward and away from the other of said plates acting as a press table, each of said plates including at least one T-slot, and said upper tool part and said lower tool part each including at least one T-slot, said press further having at least two grippers mounted in each of said upper and lower plates and each including a T-slot continuously aligned with a respective said T-slot of said plates, and said T-slot of said upper tool part including two spaced recesses, wherein the improvement comprises:

at least two T-pieces, said T-pieces being spaced apart from one another in said T-slot of said upper plate and structurally separate from said grippers;

first means for bringing said T-pieces and said recesses into alignment with each other; and second means for locking and clamping said T-pieces in said T-slot of said upper tool part outside said recesses.

2. A press according to claim 1, further comprising a bar slidingly disposed in said T-slot of said upper plate, said T-pieces being integral with said bar and projecting from said T-slot of said upper plate, said first means including drive means for displacing said bar in said T-slot of said upper plate from a first end position wherein said T-pieces are situated in said recesses to a second end position wherein said T-pieces engage said T-slot of said upper tool part outside said recesses.

3. A press according to claim 1, wherein said T-pieces are fixed immovably in said T-slot of said upper plate, further comprising roller means for displacing said set of tools horizontally on said lower plate from a first end position wherein said two T-pieces enter said recesses to a second end position wherein said T-pieces engage said T-slot of said upper tool part outside said recesses.

4. A press according to claim 1, further comprising a bar slidingly disposed in said T-slot of said upper plate, said T-pieces being integral with said bar and projecting from said T-slot of said upper plate, said first means including drive means for displacing said bar in said T-slot of said upper plate from a first end position wherein said T-pieces are situated in said recesses to a second end position wherein said T-pieces engage said T-slot of said upper tool part outside said recesses, and coupling means associated with said bar for allowing vertical displacement of said bar relative to said drive means.

5. A press of the type having upper and lower press plates for chucking a set of tools consisting of an upper tool part and a lower tool part, one of said press plates acting as a press ram movable toward and away from the other of said press plates acting as a press table, each of said press plates including at least one T-slot, said press further having at least two grippers mounted in each of said upper and lower press plates and each including a T-slot continuously aligned with a respective said T-slot of said press plates, wherein the improvement comprises:

- an upper auxiliary plate having at least one T-slot, said upper auxiliary plate being secured on said upper tool part;
- a lower auxiliary plate having at least one T-slot, said lower auxiliary plate being secured on said lower tool part;
- said T-slot of said upper auxiliary plate including two spaced recesses;
- at least two T-pieces, said T-pieces being spaced apart from one another in said T-slot of said upper press plate and structurally separate from said grippers;
- first means for bringing said T-pieces and said recesses into alignment with each other; and
- second means for locking and clamping said T-pieces in said T-slot of said upper auxiliary plate outside said recesses.

6. A press according to claim 5, further comprising a bar slidingly disposed in said T-slot of said upper press plate, said T-pieces being integral with said bar and projecting from said T-slot of said upper press plate, and said first means including drive means for displacing said bar in said T-slot of said upper press plate from a first end position wherein said T-pieces are situated in said recesses to a second end position wherein said T-pieces engage said T-slot of said upper auxiliary plate outside said recesses.

7. A press of the type having upper and lower press plates for chucking a set of tools consisting of an upper tool part and a lower tool part, one of said press plates acting as a press ram movable toward and away from the other of said press plates acting as a press table, each of said press plates including at least one T-slot, and said upper tool part and said lower tool part each including at least one T-slot, said press further having at least two grippers mounted in each of said upper tool part and said lower press plate and each including a T-slot continuously aligned with a respective said T-slot of said upper tool part and said lower press plate, and said T-slot of said upper press plate including two spaced recesses, wherein the improvement comprises:

- at least two T-pieces, said T-pieces being spaced apart from one another in said T-slot of said upper tool part and structurally separate from said grippers;
- first means for bringing said T-pieces and said recesses into alignment with each other; and
- second means for locking and clamping said T-pieces in said T-slot of said upper press plate outside said recesses.

8. A press according to claim 7, further comprising a bar slidingly disposed in said T-slot of said upper tool part, said T-pieces being integral with said bar and projecting from said T-slot of said upper tool part, and said first means including drive means for displacing said bar in said T-slot of said upper tool part from a first end position wherein said T-pieces are situated in said recesses to a second end position wherein said T-pieces engage said T-slot of said upper press plate outside said recesses.

9. A press according to claim 7, wherein said T-pieces are fixed immovably in said T-slot of said upper tool part, further comprising roller means for displacing said set of tools horizontally on said lower press plate from a first end position wherein said two T-pieces enter said recesses to a second end position wherein said T-pieces engage said T-slot of said upper press plate outside said recesses.

10. A press according to claim 7, further comprising an upper auxiliary plate having at least one T-slot, said upper auxiliary plate being secured on said upper tool part, a lower auxiliary plate having at least one T-slot, said lower auxiliary plate being secured on said lower tool part, a bar slidingly disposed in said T-slot of said upper auxiliary plate, said T-pieces being integral with said bar and projecting from said T-slot of said upper auxiliary plate, and said first means including drive means for displacing said bar in said T-slot of said upper auxiliary plate from a first end position wherein said T-pieces are situated in said recesses to a second end position wherein said T-pieces engage said T-slot of said upper press plate outside said recesses.

11. A press according to claim 7, further comprising a bar slidingly disposed in said T-slot of said upper tool part, said T-pieces being integral with said bar and projecting from said T-slot of said upper tool part, said first means including drive means for displacing said bar in said T-slot of said upper tool part from a first end position wherein said T-pieces are situated in said recesses to a second end position wherein said T-pieces engage said T-slot of said upper press plate outside said recesses, and coupling means associated with said bar for allowing vertical displacement of said bar relative to said drive means.

* * * * *